(12) United States Patent
Gregory et al.

(10) Patent No.: US 10,371,588 B2
(45) Date of Patent: Aug. 6, 2019

(54) HIGH RESOLUTION STRAIN GAGES FOR CERAMIC MATRIX COMPOSITES AND METHODS OF MANUFACTURE THEREOF

(71) Applicant: Rhode Island Council on Postsecondary Education, Warwick, RI (US)

(72) Inventors: Otto Gregory, Wakefield, RI (US); John T. Rhoat, Wakefield, RI (US); Kevin Rivera, Providence, RI (US)

(73) Assignee: Rhode Island Council on Postsecondary Education, Warwick, RI (US)

( * ) Notice: Subject to any disclaimer, the term of this patent is extended or adjusted under 35 U.S.C. 154(b) by 8 days.

(21) Appl. No.: 15/640,348

(22) Filed: Jun. 30, 2017

(65) Prior Publication Data

US 2018/0003576 A1 Jan. 4, 2018

Related U.S. Application Data

(60) Provisional application No. 62/357,609, filed on Jul. 1, 2016, provisional application No. 62/526,277, filed on Jun. 28, 2017.

(51) Int. Cl.
*G01L 1/22* (2006.01)
(52) U.S. Cl.
CPC .......... *G01L 1/2281* (2013.01); *G01L 1/2293* (2013.01)
(58) Field of Classification Search
CPC ........ G01L 1/2281; G01L 1/2293; B81B 3/00
See application file for complete search history.

(56) References Cited

U.S. PATENT DOCUMENTS 3,007,989 A 11/1961 Nicholson et al.
4,225,569 A 9/1980 Matsui et al.
(Continued)

OTHER PUBLICATIONS

"Revised Thermocouple Reference Tables: Type S, Omega Engineering, Stanford, CT", http://www.omega.com:80/temperature/Z/pdf/z208-209.pdf, 2001.
(Continued)

*Primary Examiner* — David J Bolduc
(74) *Attorney, Agent, or Firm* — Peacock Law P.C.; Philip D. Askenazy

(57) ABSTRACT

Strain gages for use with ceramic matrix composites (CMCs), and methods of manufacture therefore. The strain gages use the CMC as a strain element. For semiconductor CMCs, for example SiC fiber-reinforced SiC CMC, their large gage factor enables high sensitivity, high accuracy strain measurements at high temperatures. By using a single elemental metal such as platinum, or another high temperature conductive material, the strain gages can operate at temperatures over 1600° C. The conductive material is preferably deposited on a dielectric or insulating layer, and contacts the CMC substrate through openings in that layer. The materials can be deposited using thin film vacuum techniques or thick film techniques such as pastes or inks. The strain gages can be configured to measure only the mechanical strain independent of the apparent or thermal strain. The strain gages can be incorporated into a bulk CMC structure during layup, and can optionally measure the strain of only desired fiber weave orientations.

28 Claims, 3 Drawing Sheets

(56) References Cited

U.S. PATENT DOCUMENTS

| | | | |
|---|---|---|---|
| 4,450,314 A | 5/1984 | Huther | |
| 4,907,052 A | 3/1990 | Takada et al. | |
| 5,523,957 A | 6/1996 | Perron et al. | |
| 5,804,277 A | 9/1998 | Ashbee | |
| 6,729,187 B1 | 5/2004 | Gregory | |
| 7,687,016 B1 | 3/2010 | Dicarlo et al. | |
| 7,741,834 B2 | 6/2010 | Dang | |
| 7,849,752 B2 | 12/2010 | Gregor et al. | |
| 8,052,324 B2 | 11/2011 | Gregory et al. | |
| 8,132,467 B2* | 3/2012 | Shinde | G01N 3/56 73/774 |
| 8,191,426 B2 | 6/2012 | Gregory et al. | |
| 8,894,918 B2 | 11/2014 | Dicarlo et al. | |
| 2004/0202886 A1 | 10/2004 | Subramanian | |
| 2005/0115329 A1 | 6/2005 | Gregory et al. | |
| 2005/0147877 A1 | 7/2005 | Tarnowski et al. | |
| 2006/0288794 A1* | 12/2006 | Hardwicke | G01L 1/2287 73/763 |
| 2007/0029303 A1 | 2/2007 | Bowen | |
| 2007/0056624 A1 | 3/2007 | Gregory et al. | |
| 2008/0025366 A1 | 1/2008 | McBurney | |
| 2008/0223504 A1* | 9/2008 | Ohno | H01L 35/22 156/89.12 |
| 2008/0230904 A1 | 9/2008 | Lee | |
| 2008/0264175 A1 | 10/2008 | Leman et al. | |
| 2009/0039911 A1* | 2/2009 | Dang | G01R 31/2812 324/762.02 |
| 2009/0078561 A1 | 3/2009 | Teo et al. | |
| 2009/0121896 A1* | 5/2009 | Mitchell | H04Q 9/00 340/870.31 |
| 2009/0290614 A1 | 11/2009 | Gregory et al. | |
| 2010/0109209 A1 | 5/2010 | Pasquere | |
| 2010/0117859 A1 | 5/2010 | Mitchell | |
| 2010/0226756 A1 | 9/2010 | Mitchell et al. | |
| 2010/0319436 A1 | 12/2010 | Sun et al. | |
| 2011/0280279 A1 | 11/2011 | Gregory et al. | |
| 2013/0020670 A1 | 1/2013 | Hori et al. | |
| 2013/0298648 A1 | 11/2013 | Sun et al. | |
| 2014/0058166 A1 | 2/2014 | Bedard et al. | |
| 2014/0346502 A1 | 11/2014 | Matsukizono | |
| 2015/0364667 A1 | 12/2015 | Jarmon | |
| 2016/0153842 A1* | 6/2016 | Cheverton | G01L 1/24 374/121 |
| 2016/0169749 A1 | 6/2016 | Glasheen et al. | |
| 2016/0305271 A1* | 10/2016 | Schmidt | F01D 5/147 |
| 2017/0008125 A1 | 1/2017 | Bruck et al. | |
| 2017/0234739 A1 | 8/2017 | Gregory et al. | |
| 2017/0373612 A1* | 12/2017 | Sellinger | H02N 2/186 |

OTHER PUBLICATIONS

Ahmed, et al., "Comparison of Argon Triple Point between NIS-Egypt and LNE-INM/CNAM/France", Journal of Metrology Society of India, vol. 23, No. 1, 2008, 3-9.

Chaston, "The Oxidation of the Platinum Metals", Platinum Metals Review, vol. 19, No. 4, 1975, 135-140.

Chou, "Anomalous solid state reaction between SiC and Pt", J. Mater. Res., vol. 5, No. 3, Materials Research Society, Mar. 1990, 601-608.

Chou, "High temperature reactions between SiC and platinum", Journal of Materials Science, vol. 26, 1991, 1412-1420.

Gegner, et al., "Diffusivity and solubility of oxygen in solid palladium", J Mater Sci, vol. 44, Springer Science + Business Media, LLC, 2009, 2198-2205.

Kreider, et al., "High temperature materials for thin-film thermocouples on silicon wafers", This Sold Films, vol. 376, Elsevier Science S.A., 2000, 32-37.

Naslain, "SiC-Matrix Composites: Nonbrittle Ceramics for Thermo-Structural Application", International Journal of Applied Ceramic Technology, vol. 2, No. 2, 2005, 75-84.

Rijinders, et al., "Pattern formation in Pt—SiC diffusion couples", Solid State Ionics, vol. 95, Elsevier Science B.V., 1997, 51-59.

Tougas, et al., "Metallic and Cermic Thin Film Thermocouples for Gas Turbine Engines", Sensors, vol. 13, Nov. 8, 2013, 15324-15347.

Tougas, et al., "Thin film platinum-palladium thermocouples for gas turbine engine application", Thin Solid Films, vol. 539, Elsevier B.V., 2013, 345-349.

Wrbanek, et al., "Ceramic thin film thermocouples for SiC-based ceramic matrix composites", Thin Solid Films, doi:10.1016/j.tsf.2012.04.034, 2012.

Yu, et al., "NiAl bond coats made by a directed vapor deposition approach", Materials Science and Engineering A, vol. 394, Elsevier B.V., 2005, 43-52.

Smith, et al., "Electrical Resistance as a Nondestructive Evaluation Technique for SiC/SiC Ceramic Matrix Composites Under Creep-Rupture Loading", International Journal of Applied Ceramic Technology, vol. 8, No. 2, The American Ceramic Society, 2011, 298-307.

* cited by examiner

HIGH RESOLUTION STRAIN GAGES FOR CERAMIC MATRIX COMPOSITES AND METHODS OF MANUFACTURE THEREOF

CROSS-REFERENCE TO RELATED APPLICATIONS

This application claims priority to and the benefit of the filing of U.S. Provisional Patent Application Ser. No. 62/357,609, entitled "High Resolution Strain Gage for Ceramic Matrix Composites and Methods of Preparation Thereof", filed on Jul. 1, 2016, and U.S. Provisional Patent Application Ser. No. 62/526,277, entitled "Ceramic Matrix Composite Based Thermocouples", filed on Jun. 28, 2017, the specifications and claims of which are incorporated herein by reference.

BACKGROUND OF THE INVENTION

Field of the Invention (Technical Field)

The present invention is related to strain gages that use ceramic matrix composites (CMCs) as the strain element.

Background Discussion

Note that the following discussion refers to a number of publications and references. Discussion of such publications herein is given for more complete background of the scientific principles and is not to be construed as an admission that such publications are prior art for patentability determination purposes.

The next generation gas turbine engines will employ advanced materials that are specifically designed to handle the harsh environment inside the hot section of an engine. Recently there has been interest in using ceramic-based materials, such as silicon carbide fiber-reinforced silicon carbide (SiC/SiC) or carbon fiber-reinforced carbon (C/C) ceramic matrix composites to replace superalloy-based engine components in the hot sections of gas turbine engines. Engine components based on CMCs are lighter and have superior thermo-mechanical properties compared to nickel-based superalloys. Thus, they can operate at higher temperatures, which enable greater overall efficiencies. Advanced instrumentation must not only survive the rotational forces and high temperatures but must also be capable of accurately monitoring the temperature and strain of CMC engine components. Given the harsh conditions inside the gas turbine engine, it is becoming increasingly more difficult to instrument these CMC engine components to monitor structural integrity for extended periods of time, without adversely affecting operation of the engine. Thus there is a need to develop instrumentation that can survive the higher operating temperatures associated with these advanced engine designs and monitor the conditions, such as strain, during operation. A strain gage (or strain gauge) is a device that measures the strain on an object. While NiCr strain gages have been on the market for some time now and are generally well understood, the measured gage factor (or gauge factor) associated with NiCr strain gages are only sufficient for low to moderate temperature strain measurements.

Typical thin film sensors are deposited directly onto the surface of a component so that a true surface measurement is possible. In this way, thin film instrumentation becomes an integral part of the surface of a component. Thin films sensors have several advantages, since they do not interfere with gas flow paths through the engine because they have a low profile; i.e. they have thicknesses on the order of micrometers, which is well below the boundary layer thickness. Thin film sensors have extremely small masses (on the order of 10-6 g). With a minimal mass, this means that thin film sensors will not alter the vibrational modes of blades comprising the turbine. It also translates into faster response times and eliminates the need for adhesives. However, thin film sensors also have some disadvantages including relatively small diffusion distances, which can lead to decreased stability at elevated temperature. There is a need for strain gages that can be implemented on CMC components at extremely high temperatures, thus meeting the industry-wide need for an accurate, high resolution strain gage for use in high temperature applications.

SUMMARY OF THE INVENTION
(DISCLOSURE OF THE INVENTION)

An embodiment of the present invention is a strain gage comprising a ceramic matrix composite (CMC) layer as a strain element. The strain gage is preferably capable of operating at greater than 1000° C., and more preferably greater than 1600° C. The strain gage preferably further comprises a conductive material, preferably a single elemental metal such as platinum, or alternatively indium tin oxide. A portion of the conductive material is deposited on a dielectric, insulating, or planarizing film, the layer deposited on the CMC layer, the layer preferably comprising mullite. The conductive material preferably contacts the CMC layer through openings in the film. The strain gage preferably comprises an oxygen diffusion barrier deposited on the conductive material in a vicinity of the openings. The oxygen diffusion barrier preferably comprises indium oxynitride or indium-tin-oxynitride. When the conductive material comprises a metal, or any material that is not a silicide diffusion barrier, the strain gage preferably comprises a silicide diffusion barrier deposited between the metal (or other material) and the CMC layer. The silicide diffusion barrier preferably comprises indium tin oxide. The conductive material and the film may be deposited as a paste, ink, spray, or cement, preferably without the use of a vacuum chamber. Damage to the conductive material or the film in such case is preferably reparable by depositing paste, ink, spray, or cement in situ. The conductive material and the film is alternatively deposited and patterned using vacuum sputtering and/or photolithography.

The strain gage optionally comprises a resistor comprising the conductive material oriented perpendicular to a strain direction of the strain gage. The resistor can be disposed in series with the strain gage, or alternatively the resistor can form a second strain gage having the resistor as a strain element. Such strain gage is preferably capable of measuring mechanical strain independent of apparent or thermal strain. The CMC layer preferably comprises a semiconductor, preferably a wide bandgap semiconductor. The semiconductor is preferably selected from the group consisting of silicon carbide, boron nitride, and carbon. The CMC layer preferably comprises a silicon carbide fiber-reinforced silicon carbide matrix, a carbon fiber-reinforced carbon matrix, or a boron nitride fiber-reinforced boron nitride matrix. The strain gage can be embedded within a bulk composite structure comprising the CMC layer, in which case it is preferably inserted into the bulk composite structure during layup of the bulk composite structure. Such a bulk composite structure preferably comprises a plurality of the strain gages, optionally wherein the strain gages are electrically connected to only CMC layers comprising a desired fiber weave orientation.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Figure 1:
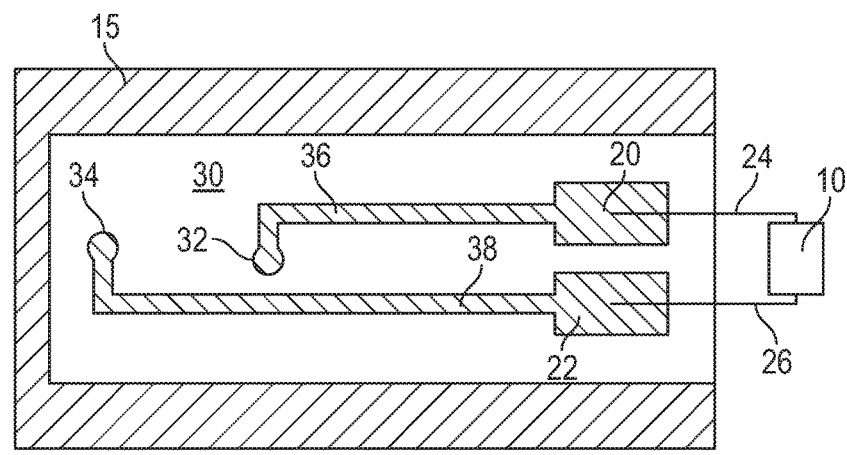
FIG. 1 is a schematic of a CMC strain gage comprising two bond pads and two lead outs comprising platinum and fabricated using thick or thin film technology.

The present invention relates to the use of either thin or thick film technology to fabricate a high-resolution strain gage (or strain gage) for use with CMCs, particularly wide bandgap semiconductor CMCs, including but not limited to SiC/SiC, C/C, or boron nitride fiber-reinforced boron nitride (BN/BN) CMCs. In some embodiments the strain gage can be applied to the surface of CMCs so that the CMC itself contributes to the large gage factors anticipated to occur with wide bandgap semiconductors. Because wide bandgap semiconductors have very large piezoresistive responses, gage factors for n-type silicon carbide can be as large as −188, the magnitude of which is two orders of magnitude larger than the gage factor associated with NiCr strain gages currently prevalent in the industry. This translates into increased strain measurement accuracy at extremely temperatures, as well as much higher resolution and sensitivity due to the very large gage factors of such materials at high temperatures, yielding between 1 and 2 orders of magnitude improvement in resolution when compared with conventional materials and methods.

Embodiments of the present invention relate to a device, or strain gage, that is ideally suited for use at high temperatures; in at least one embodiment only a single metal, preferably platinum, is used in the strain gage. Platinum melts at 1768° C., which makes it possible for the strain gage to be used at high temperatures up to that melting point (or the melting or softening point of the CMC, whichever is lower). Any high melting temperature alloy or metal may alternatively be used. Additionally, the strain gages of the present invention can preferably be integrated into any CMC part using either thin or thick film technology. There are many advantages to using thick film technology, including at least the following benefits: (a) a vacuum chamber is not required for the fabrication process; (b) it can be applied to larger parts that cannot fit into a vacuum chamber, (c) typical sputtering and other lithography steps can be omitted if small line-widths and spaces are not required; and (d) pastes, cements or thermal spraying can be used to deposit the metal and dielectric layers. For example, platinum lines and coatings of dielectric materials or materials that insulate or planarize the surface can be applied using these techniques.

The gage factor of a strain gage is typically expressed as $$G = \frac{\Delta R}{R_{ref}} \cdot \frac{1}{\varepsilon}$$

where $\Delta R$ is the change in resistance caused by the strain, $R_{ref}$ is the resistance of the non-deformed material, and $\varepsilon$ is the strain. However, semiconductors exhibit a large strain-dependent resistivity $d\rho/d\varepsilon$, which is driven largely by the changes in the band structure of the semiconductor as it is deformed. The deformation changes the mobility and carrier concentration in the semiconductor, which results in a much larger piezoelectric effect in both elemental semiconductors, such as germanium and silicon, and compound semiconductors, such as SiC and GaN. Thus, the gage factor of a semiconductor can be described in terms of an additional strain dependent resistivity coefficient, which is expressed as:

$$G = 1 + 2\eta + \left(\frac{d\rho}{\rho}\frac{1}{d\varepsilon}\right)$$

where $\eta$ is Poisson's ratio, $\varepsilon$ is strain and $\rho$ is the semiconductor resistivity. As a result, the gage factor attributed to semiconductor CMC strain gages, such as those comprising SiC—SiC CMC substrates, is much higher than conventional metal strain gages. In at least one embodiment, the gage factor of the SiC strain gage is −188, several orders of magnitude larger than the NiCr strain gage commonly used in industrial applications.

In the embodiment of the present invention shown in FIG. 1, shown in FIG. 1, strain gage 10 comprises a CMC 15, preferably comprising SiC—SiC, as is the active strain element. Bond pads 20, 22 and lead outs 24, 26 preferably comprise platinum and can be fabricated using techniques such as thin film or thick film technologies. According to at least one embodiment, thick or thin film platinum is applied on the surface of dielectric coating 30 on CMC 15. The platinum is preferably a thin film with a thickness of approximately 1.5-2 µm, but any thickness may be used. The platinum contacts CMC 15 through openings 32, 34 in dielectric coating 30 so that current is passed preferably via legs 36, 38 through the platinum, through CMC 15, and then back through the platinum to complete the circuit. As with any strain gage, both mechanical and apparent (thermal) strain contributes to the measured resistance. Because the bulk CMC is the active strain element, the strain gage will have improved electrical and chemical stability compared to conventional gages, particularly in oxidizing environments. This translates into lower drift rates and thus, will result in improved electrical stability with respect to time or as a function of time.

It is preferable that the bond pads are deposited on the dielectric material, which can comprise mullite or any other dielectric or insulating material, since it provides electrical isolation between the platinum or other metal traces and the CMC substrate. The dielectric coating can be any thickness; in at least one embodiment the thickness is approximately 200 μm. Openings 32, 34 may be created in any way; for example, the dielectric may be deposited using a mask, or may be etched after deposition. Furthermore, when the lead outs are spot welded to the bond pads, the dielectric prevents thermal interdiffusion between the CMC and the platinum. In alternative embodiments, the lead outs are attached to the bond pads using high purity platinum paste. Increased stability at high temperatures is important most thin film sensors fail due to the small diffusional distances associated with these devices. Thick film devices are also affected by interdiffusion at high temperatures.

In the example of platinum and a CMC comprising SiC, at high temperatures, the Pt:SiC interface thermocouple can undergo oxidation; i.e. oxygen can diffuse through the platinum film and react with the SiC to form an $SiO_2$ layer. This oxide changes the nature of the ohmic contact associated with the Pt:SiC junction and produces a rectifying junction, which ultimately contributes to the measured electromotive force (emf). This can lead to considerable signal drift that increases with increasing temperature. Thus, implementing an effective oxygen diffusion barrier improves the high temperature performance of the strain gage. The Pt:SiC interface can also undergo platinum-silicide formation at temperatures greater than 600° C. The formation of platinum silicides is normally inhibited by the diffusion of oxygen through the platinum, but when an oxygen diffusion barrier is employed, the thermodynamics shift in favor of the formation of platinum silicides in the absence of oxygen at the Pt:SiC junction. At approximately 1100° C. a mixture of silicides are produced, but no carbides are typically formed since carbon precipitates migrate to the platinum-silicide grain boundaries. Thus, a platinum silicide diffusion barrier is preferably utilized in addition to an oxygen diffusion barrier to enable the strain gages of the present invention to operate at temperatures higher than approximately 1000° C.

Figure 5:
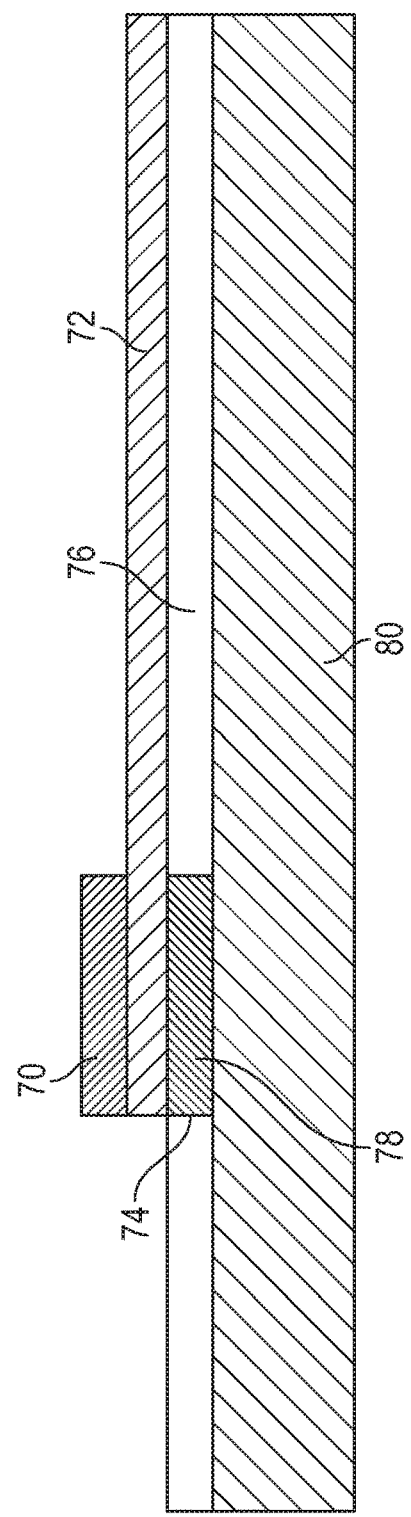
FIG. 5 is a cross-sectional schematic showing an example of the use of diffusion layers with the present invention.

FIG. 5 is a cross-sectional schematic showing an embodiment using diffusion layers with the present invention. Oxygen diffusion barrier 70 covers metal 72 (preferably platinum) in the vicinity of the opening 74 in dielectric (or insulating or planarizing) coating 76. Silicide diffusion barrier 78 is deposited within opening 74 to prevent metal silicide formation which may occur at high temperatures due to interdiffusion of metal and silicon in the CMC where metal 72 contacts CMC 80. Silicide diffusion barrier 78 may or may not have the same thickness as dielectric coating 76. In some embodiments, the oxygen diffusion barrier can be extended to completely cover the top and sides of the metal layer in the vicinity of the opening in the dielectric layer.

In at least one embodiment, in which the metal is platinum and the CMC comprises SiC/SiC, the oxygen diffusion barrier comprises indium oxynitride (InON or InNO) or indium-tin-oxynitride (ITON) and has a thickness of approximately 20 μm, although it may have any thickness. The InON or ITON may be deposited by any method, for example by reactively sputtering $In_2O_3$ in an argon/nitrogen plasma. In some embodiments the silicide diffusion barrier comprises indium tin oxide (ITO), which can have a film thickness of approximately 20 μm, although it may have any thickness. The ITO can be deposited using any method, for example sputtering. In experiments, the combination of an InON oxygen diffusion barrier and ITO silicide diffusion barrier results in continued operation of thin film devices at over 1000° C. Other materials for diffusion barriers may be used to further increase the maximum operating temperature of the devices.

In alternative embodiments of the present invention, the platinum or other metal may be entirely replaced by another conductive material. It is preferable that the conductive material has a melting, softening, or decomposition temperature at least as high as the melting temperature of platinum. In at least one embodiment thick or thin indium tin oxide ITO is used in place of the platinum. The ITO is preferably deposited a thin film with a thickness of approximately 10-20 μm, but any thickness may be used. In these embodiments, no separate silicide diffusion barrier is required; however, it is still advantageous to deposit an oxygen diffusion barrier, such as InON or ITON, on the conductive ITO to prevent oxygen diffusion through the ITO or reaction with the conductive ITO underneath.

Figure 2:
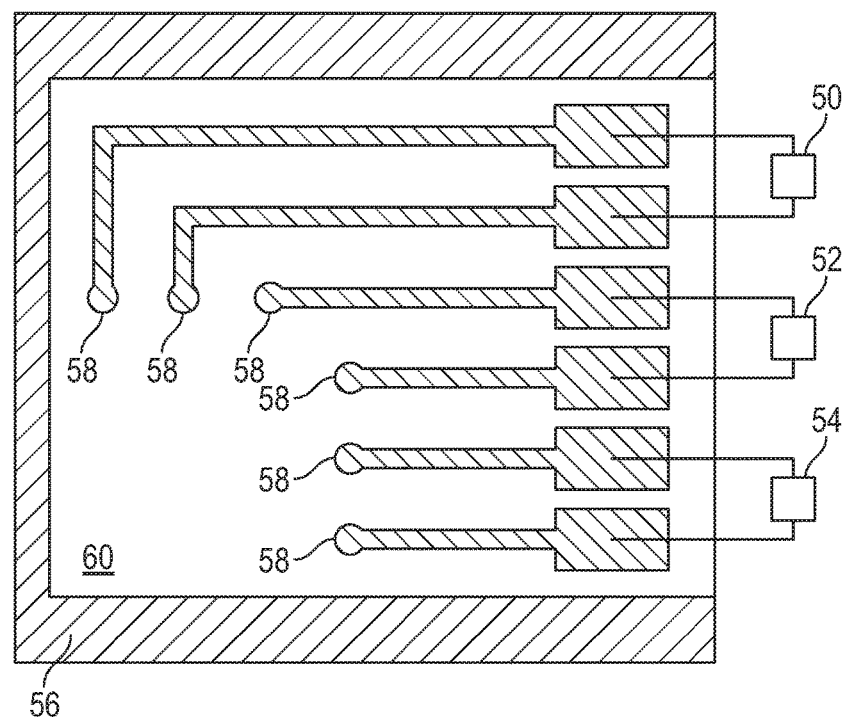
FIG. 2 is a schematic of a CMC strain gage rosette comprising three CMC strain gages in use simultaneously.

In the embodiment of the present invention shown in FIG. 2, the strain gage comprises a strain gage rosette. This embodiment operates under similar principles as the strain gage in FIG. 1, except that three separate strain gages 50, 52, 54 are disposed in a rosette configuration to measure strain in any direction in the plane. Other rosette configurations, such as the three strain gages being oriented in an equilateral triangle, may alternatively be employed. Three sets of platinum lead-outs and three sets of bond pads are preferably used for this configuration, and the platinum legs contact CMC substrate 56 through six openings 58 in dielectric layer 60. By using additional signal processing, the resistance created in each circuit and can be measured and mechanical strain can be calculated in any direction, along with the apparent strain.

For applications such as the use of strain gages in the hot sections of gas turbine engines, apparent strain can be a major contributor to overall strain and can often change with time. Therefore, embodiments of the present invention can be configured to measure mechanical strain independently of apparent strain. Specifically, the total contribution to the measured strain for a measured resistance change, in the form of a fractional resistance change, is the sum of the mechanical strain at a given temperature and the apparent strain. The total contribution to the apparent strain is the temperature coefficient of resistance (TCR) of the SiC (or other CMC) substrate and the difference in the thermal expansion coefficient (TCE) between the gage element and the substrate, as shown below:

$$\Delta\varepsilon = \frac{[\Delta R/R]_g}{G} = \frac{[(\Delta R/R)_{g,T} - (\Delta R/R)_T]}{G}$$

where $$\left(\frac{\Delta R}{R}\right)_T \equiv [TCR_g + (\beta_s - \beta_g)G]\Delta T$$

where $\beta_s$ is the substrate TCE and $\beta_g$ is the gage TCE. Because in embodiments of the present invention the gage and the substrate preferably comprise the same material, $\beta_s = \beta_g$, so $$\left(\frac{\Delta R}{R}\right)_T = \alpha_g \Delta T$$

and the total contribution of the apparent strain is dependent only on the TCR $\alpha_s$ of the substrate, which is the same as $\alpha_g$ and is defined as $$TCR = \frac{\Delta R}{\Delta T} \times \frac{1}{R_0}$$

Figure 3:
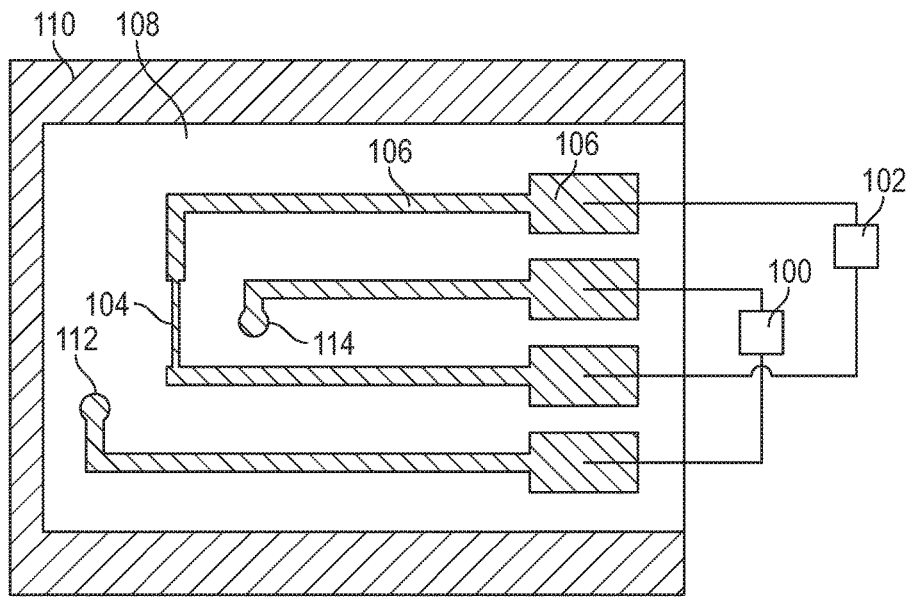
FIG. 3 is a schematic of an uncompensated static CMC strain gage.

When large temperature gradients are superimposed across the surface of an engine component, strain measurement under typical engine conditions using resistance strain gages can lead to considerable apparent strain effects. These can be mitigated by employing strain gages with a small TCR. Semiconductors such as SiC typically have relatively large, negative TCRs. Due to the large gage factors associated with such semiconductors, highly accurate strain measurements are possible. One embodiment of the present invention, as shown in FIG. 3, can be used for such measurements. In FIG. 3, two strain gages, one SiC—SiC CMC and the other platinum, can be used to measure mechanical strain independently of thermal strain. Thick or thin film platinum 106 is deposited on the surface of dielectric coating 108 on CMC 110. The platinum will contact the CMC in two locations 112, 114 so that a current flows through the platinum and into the CMC and then back to the platinum in a single direction. The CMC will acts as a resistor that will change its resistance as the component is strained in that direction. Such CMC strain gage 100 is thus preferably disposed in the direction as the strain. It has a characteristic resistance $R_2$ which is a function of both the mechanical and thermal or apparent strain. Platinum strain gage 102, having resistance $R_1$ due in part to platinum resistor 104, is preferably disposed perpendicular to the direction of the strain, and thus measures the resistance as a function of only thermal or apparent strain. The gage factor for this static strain gage can be calculated as:

$$G = \frac{\Delta R}{R_{ref}} \cdot \frac{1}{\epsilon}$$

where $\Delta R = R - R_{ref}$ and $R = R_2 - R_1$, giving $\Delta R = (R_2 - R_1) - R_{ref}$. Thus $$G = \frac{(R_2 - R_1) - R_{ref}}{R_{ref}} \cdot \frac{1}{\epsilon}$$

By subtracting $R_1$ from $R_2$, the mechanical strain in a given direction can be determined, yielding a temperature-independent strain measurement. More details may be found in commonly owned U.S. Pat. Nos. 6,729,187 and 8,191,426, incorporated herein by reference.

Figure 4:
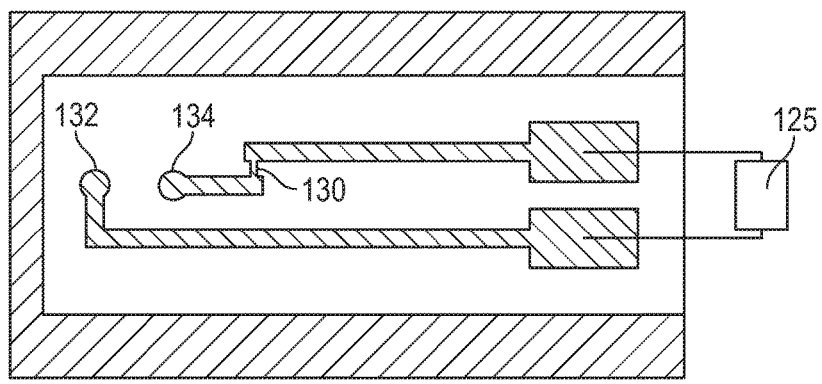
FIG. 4 is a schematic of a self-compensated static CMC strain gage.

Another embodiment, shown in FIG. 4, is a self-compensated static strain gage 125 which functions on similar principles as the prior embodiment, but yields a measurement of the mechanical strain independent of temperature by making use of a SiC—SiC CMC strain gage placed in series with platinum resistor 130. The SiC—SiC CMC strain gage is preferably fabricated using thin film technology. The platinum lines contact the SiC—SiC CMC in two places 132, 134 so that the current is forced in a circuit through the platinum, then through the CMC substrate, and then back through the platinum and the platinum resistor placed in series. The platinum strain gage is preferably perpendicular to the CMC strain gage. This allows the strain gage to measure only the mechanical strain without any additional signal conditioning; specifically, the value of the resistance measured will only be a function of mechanical strain and not apparent strain.

Embodiments of the present invention are ideally suited for high temperature applications because they require only a single metal, which is preferably a high melting point metal such as platinum. When platinum is used, the strain gages of the present invention can be used at exceedingly high temperatures, since platinum melts at 1768° C. Further, because this approach only requires a single metal, it requires half of the processing steps typically required to make the thin film strain gages. This provides the added benefit of a more streamlined and simplified fabrication sequence. Persons of ordinary skill will appreciate appropriate substitutions for platinum.

Although the dielectric and metal film layers may be deposited using thin film techniques, such as vacuum sputtering and photolithography, another aspect of the present invention involves the capability to fabricate these sensors using thick film technology. For example, inks, pastes, or cements, or even thermal spraying, can be used to form the platinum and dielectric portions of the devices. One advantage of this process is that it eliminates the need for sputtering and the necessity for a vacuum chamber. This has many benefits, for example, strain gages of the present invention can now be easily repaired in-situ by, for example deposition of metallic ink. Before deposition of the metal, the CMC substrate is preferably pre-etched, for example with buffered HF, to remove any native oxide layer that may have formed on the surface during previous heating steps (for example during deposition of the dielectric layer).

Further, the present invention creates the possibility of fabricating truly "embedded" strain gages. In other words, the relative contributions of the fibers relative to the matrix phase can now be separated and identified in more fundamental investigations. Persons of ordinary skill will appreciate the benefits and advantages afforded by this capability. By way of non-limiting example, the present invention creates the possibility of determining the effect of fiber layup and/or orientation on the overall mechanical properties or characteristics in-situ, for instance during the operation of a jet engine.

CMCs comprise ceramic fibers or woven ceramic fibers that lie in a ceramic matrix phase. For example, SiC/SiC composites have a SiC matrix phase and a SiC fiber phase. The fiber weaves can be oriented in different directions with respect to the long axis of the CMC beam, and test results on SiC weaves have indicated that the weave orientation affects certain sensor properties, as shown in Table 1.

TABLE 1

| Fiber Orientation | Voltage (μV/°K) | Drift rate (° C./hr) |
|---|---|---|
| Horizontal | 148.6 | 2.68 |
| 30° | 170 | 2.12 |
| 45° | 207 | 1.98 |
| Parallel | 251.6 | 1.8 |

Specifically, thermoelectric testing suggests that the SiC fibers in the weave plays a more significant role than the SiC matrix in determining the overall thermoelectric properties. Thus the fiber weaves in the CMC matrix typically will dictate the piezoresistive properties such that any strain experienced by the weave (in situ) would result in a change in resistance and thus, would offer the possibility of embedded sensing. For example, by connecting electrically to a particular weave through vias or the like, it is possible to select the weave of interest in the layup and measure the strain of the desired weave layers in the composite structure after it is fabricated. An electrical connection to a particular weave would be made, ensuring that it is electrically isolated from the rest of the matrix (and other fibers) in the composite during the layup process. For example, during the CMC layup process such strain sensors could be activated by sputtering or otherwise depositing metal (e.g. platinum) contacts through the vias and the depositing a dielectric to minimize cross talk from one weave to another.

As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Before explaining the various embodiments of the disclosure, it is to be understood that the invention is not limited in its application to the details of construction and the arrangement of the components set forth in the following description. Other embodiments can be practiced or carried out in various ways. Also, it is to be understood that the phraseology and terminology employed herein is for the purpose of description and should not be regarded as limiting the inventions described in any way.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A strain gage comprising:
a ceramic matrix composite (CMC) layer;
a film deposited on a portion of said CMC layer; and
a conductive material deposited partially on said film and partially on said CMC layer, said conductive material transmitting a change in an electrical property of said CMC layer when said CMC layer is strained.

2. The strain gage of claim 1 capable of operating at greater than 1000° C.

3. The strain gage of claim 1 capable of operating at greater than 1600° C.

4. The strain gage of claim 1 wherein said conductive material is a single elemental metal.

5. The strain gage of claim 4 wherein said metal is platinum.

6. The strain gage of claim 1 wherein said conductive material is indium tin oxide.

7. The strain gage of claim 1 wherein said film comprises a dielectric, insulating, or planarizing film.

8. The strain gage of claim 7 wherein said film comprises mullite.

9. The strain gage of claim 7 wherein said conductive material contacts said CMC layer through openings in said film.

10. The strain gage of claim 9 comprising an oxygen diffusion barrier deposited on said conductive material in a vicinity of said openings.

11. The strain gage of claim 10 wherein said oxygen diffusion barrier comprises indium oxynitride or indium-tin-oxynitride.

12. The strain gage of claim 7 wherein said conductive material comprises a metal and said strain gage comprises a silicide diffusion barrier deposited between said metal and said CMC layer.

13. The strain gage of claim 12 wherein said silicide diffusion barrier comprises indium tin oxide.

14. The strain gage of claim 7 wherein said conductive material and said film is deposited as a paste, ink, spray, or cement.

15. The strain gage of claim 14 wherein said conductive material and said film is deposited without the use of a vacuum chamber.

16. The strain gage of claim 14 wherein damage to said conductive material or said film is reparable by depositing paste, ink, spray, or cement in situ.

17. The strain gage of claim 1 wherein said conductive material and said film are deposited and patterned using vacuum sputtering and/or photolithography.

18. The strain gage of claim 1 comprising a resistor comprising said conductive material oriented perpendicular to a strain direction of said strain gage.

19. The strain gage of claim 18 wherein said resistor is disposed in series with said strain gage or said resistor forms a second strain gage having said resistor as a strain element.

20. The strain gage of claim 18 wherein said strain gage is capable of measuring mechanical strain independent of apparent or thermal strain.

21. The strain gage of claim 1 wherein said CMC layer comprises a semiconductor.

22. The strain gage of claim 21 wherein said semiconductor is a wide bandgap semiconductor.

23. The strain gage of claim 21 wherein said semiconductor is selected from the group consisting of silicon carbide, boron nitride, and carbon.

24. The strain gage of claim 21 wherein said CMC layer comprises a silicon carbide fiber-reinforced silicon carbide matrix, a carbon fiber-reinforced carbon matrix, or a boron nitride fiber-reinforced boron nitride matrix.

25. The strain gage of claim 1 embedded within a bulk composite structure comprising said CMC layer.

26. The strain gage of claim 25 inserted into said bulk composite structure during layup of said bulk composite structure.

27. A bulk composite structure comprising a plurality of the strain gage of claim 25, wherein said strain gages are electrically connected to only CMC layers comprising a desired fiber weave orientation.

28. The strain gage of claim 1 wherein the response of the strain gage depends on the fiber orientation of the CMC layer.

* * * * *